US006260357B1

(12) United States Patent
Goodfellow et al.

(10) Patent No.: US 6,260,357 B1
(45) Date of Patent: Jul. 17, 2001

(54) QUICK COUPLER CONTROL SYSTEM

(75) Inventors: Stephen J. Goodfellow, Derby; Steve A. Moore, Earl Shilton, both of (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/249,652

(22) Filed: Feb. 12, 1999

Related U.S. Application Data

(60) Provisional application No. 60/110,271, filed on Nov. 30, 1998.

(51) Int. Cl.[7] .......................................... F16D 31/02

(52) U.S. Cl. .......................................... 60/470; 91/447

(58) Field of Search .......................... 91/536, 526, 447, 91/445; 414/723; 37/468

(56) References Cited

U.S. PATENT DOCUMENTS 4,218,837 8/1980 Peterman .
4,343,099 8/1982 Ziegler et al. .
4,365,429 12/1982 Ecker et al. .
4,628,690 12/1986 Arai et al. .
5,063,742 11/1991 Yoshimatsu .
5,067,321 11/1991 Miyaoka .
5,081,838 1/1992 Miyaoka et al. .
5,147,173 * 9/1992 Fauber et al. ........................ 414/723
5,197,284 3/1993 Cartner .
5,211,015 5/1993 Schroeder .
5,281,076 * 1/1994 Lehman .............................. 414/607
5,419,132 5/1995 Sato et al. .
5,467,542 * 11/1995 Hulden ................................ 414/723
5,499,503 3/1996 Stoychoff .
5,575,149 11/1996 Stoychoff .
5,577,876 11/1996 Haeder et al. .

* cited by examiner

*Primary Examiner*—Edward K. Look
*Assistant Examiner*—Thomas E. Lazo
(74) *Attorney, Agent, or Firm*—John J. Cheek; Diana L. Charlton

(57) ABSTRACT

A quick coupler for coupling an implement to a work machine is provided with a control system that substantially prevents inadvertent and unintended release of the implement from the machine. Inadvertent and unintended release of the implement is prevented by requiring two separate switches to be actuated to release the implement. Actuation of one switch supplies pressurized fluid to a fluid circuit connected to an actuator operable to release the implement from the machine. However, the pressurized fluid supplied in response to actuation of the one switch is not sufficient to activate the actuator. Concurrent actuation of a second switch raises the pressure of the fluid supplied to the actuator fluid circuit to a level sufficient to activate the actuator, thus releasing the implement.

15 Claims, 4 Drawing Sheets

QUICK COUPLER CONTROL SYSTEM

CROSS REFERENCE TO RELATED APPLICATIONS

This application claims the benefit of prior provisional patent application Ser. No. 60/110,271 filed Nov. 30, 1998.

TECHNICAL FIELD

This invention relates to a system for controlling a fluid or other actuator, and more particularly, an actuator for a quick coupler adapted to couple an implement to a work machine.

BACKGROUND ART

Mechanisms for readily and releasably coupling implements to work machines are well known in the art and are commonly referred to as quick couplers. Quick couplers are used with construction equipment, such telescopic handlers for example, to secure various implements such as forks, buckets, work platforms, and other tools, to the boom of the machine. Known quick couplers typically utilize a retractable or otherwise movable member on the machine, such as a pin, that interlocks with a portion of the implement. The pin or other member can be retracted or otherwise moved to release the implement from the machine.

It is also known to provide power operated quick couplers, which use hydraulic or other power from the machine to affect the retraction and extension of the coupler pin and thus the release and coupling of the implement to the machine. For example, it is known to provide one or more control switches on a hand-operated joystick of the work machine, such as a telescopic handler or the like, to activate certain hydraulic functions, including the activation of a fluid actuator that retracts and extends the quick coupler pin or pins. Because it may be desirable to use the joystick switches to control other auxiliary hydraulic functions of the implement, a diverter valve has been provided to selectively divert the fluid supplied by the machine in response to the joystick switches to either the quick coupler or the auxiliary circuit of the implement. A concern that arises with such power operated quick couplers is the risk of the inadvertent, unintended release of the implement from the machine.

This invention is directed to overcoming one or more of the problems or concerns set forth above.

DISCLOSURE OF THE INVENTION

In one aspect of this invention, a control system for supplying power to an actuator comprises a power source and an actuator power circuit connected between the source and the actuator. A first switch is operable, when actuated, produce a first control signal, and a second switch is operable, when actuated, to produce a second control signal distinguishable from the first control signal if the first switch is concurrently actuated. A sensor receives the control signals produced by actuation of the switches, and the sensor permits the flow of power to the actuator from the source only if the second control signal is sensed by the sensor. Thus, power is supplied to the actuator only by concurrent actuation of said first and second switches.

In another aspect of this invention, the power source supplies power at a first level and, on demand, at a second level higher than the first level. The first control signal corresponds to the first power level, and the second signal corresponds to the second power level. Actuation of the first switch causes power to be selectively supplied from the source to the actuator, and actuation of the second switch causes the power level supplied by the source to be raised from the first level to the second level.

In another aspect of this invention, the actuator comprises a fluid-powered actuator, and the power source comprises a pressurized fluid source. The first and second power levels comprise first and second fluid pressures, and the sensor comprises a relief valve that permits fluid flow only if the fluid pressure is at least the second, higher pressure. Thus, pressurized fluid is supplied to the actuator only by concurrent actuation of the first and second switches.

In still another aspect of this invention, the control system is used to control the supply of pressurized fluid to an actuator of a fluid powered quick coupler used to couple an implement to a work machine.

Related methods and other features and advantages of the present invention will be apparent from the following description and the accompanying drawings.

BRIEF DESCRIPTION OF THE DRAWINGS

FIG. 5 illustrates a diverter valve forming part of the system in a "quick coupler" position.

BEST MODE FOR CARRYING OUT THE INVENTION

Figure 1:
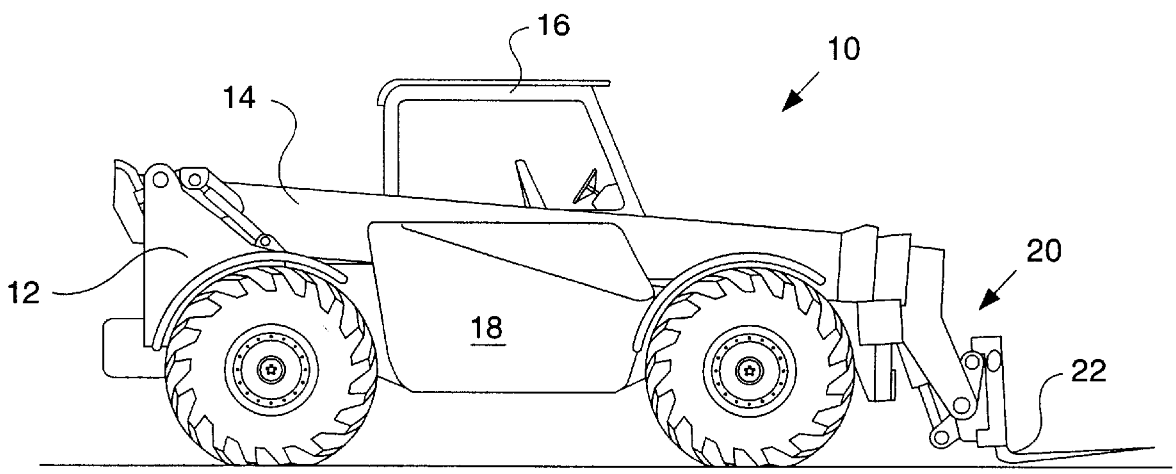
FIG. 1 is a side view of an exemplary work machine with which this invention may be used. The illustrated work machine is a telescopic handler.

Referring to FIG. 1, this invention is illustrated with respect to a construction work machine such as a telescopic handler 10. It will be understood that this invention is equally applicable to other work machines, such as hydraulic excavators, skid steer loaders, wheel loaders, and the like, as well as agricultural and forestry machinery and other non-construction-related machinery. Likewise, this invention is applicable to both mobile and stationary machinery. In general, the machine 10 comprises a frame 12, and a telescopic boom 14 is pivotally mounted to the rear of the frame 12 for elevation to various angles relative to the frame 12. In addition, an operator cab 16 is provided on one side of the frame 12, and an engine enclosure 18 is provided opposite the boom 14, so that the boom 14, when lowered, extends between the cab 14 and the engine enclosure 18. It will be noted that other telescopic handler configurations are known that do not utilize the side cab and side engine configuration illustrated in FIG. 1.

Figure 2:
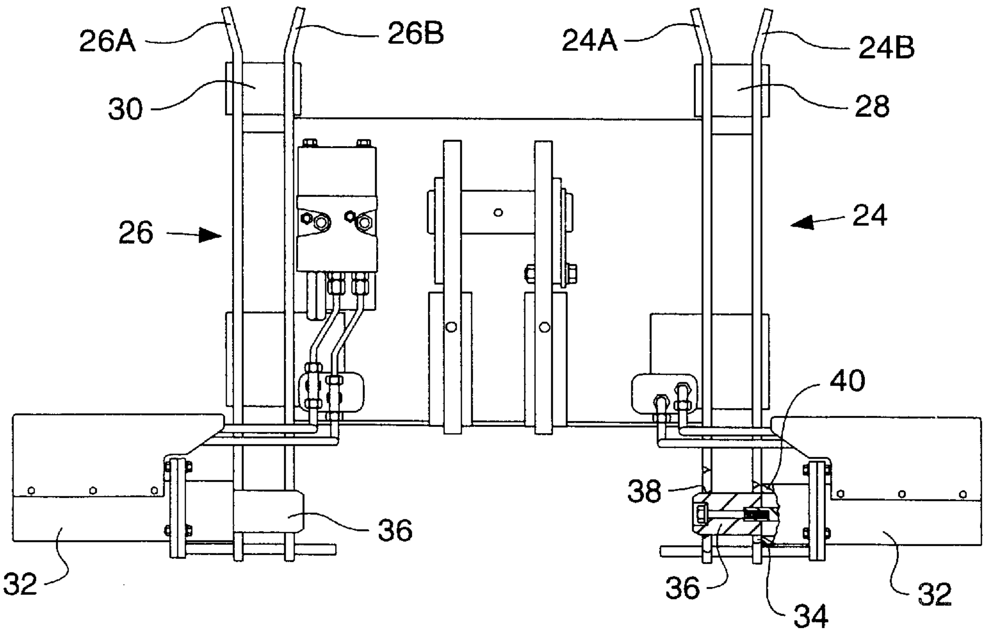
FIG. 2 is a front elevational view of a quick coupler with which this invention may be used, particularly in connection with a work machine as illustrated in FIG. 1.

With reference also to FIG. 2, the forward end of the boom 14, referred to as the boom head, is provided with a quick coupler assembly 20 used to couple an implement, such as forks 22, to the machine 10. Of course, other implements such as buckets, work platforms, and the like may also be connected to the machine using the coupler assembly 20. The coupler assembly 20 comprises left and right plate assemblies 24, 26, that are each provided with fixed upper coupling pins 28, 30, respectively. As well known in the art, the upper coupling pins 28, 30 are received in the open jaws of hooks (not shown) on the implement 20 such that the implement 20 effectively hangs from the pins 28, 30. Here it will be noted that the coupler assembly 18 may be configured to have less than or more than two fixed pins 28 or 30.

Because plate assemblies 24, 26 may be substantially mirror images of one another, further description is limited to the plate assembly 24. A fluid actuator 32, which is preferably a conventional hydraulic piston-cylinder device, is mounted to the lower end of the plate assembly 24. The rod 34 of the actuator 32 is connected to a reciprocal coupler pin 36. The coupler pin 36 is sized to fit and move within a pair of mutually aligned apertures 38, 40 in the lower ends of plates 24A, 24B forming the plate assembly 24. As apparent, supplying pressurized fluid to the head or rod ends of the actuator 32 causes the coupler pin 36 to be extended or retracted, as the case may be.

To secure the implement 22 to the machine 10, the coupler pin 36 on each side of the coupler assembly 20 is first retracted (if not already in the retracted position). As well known, the implement 22 is provided with apertures (not shown) through plate-like portions (not shown) at opposite sides (not shown) that are inserted between the individual plates 24A, 24B, 26A, 26B of the plates assemblies 24, 26 such that the implement apertures are aligned with the apertures 38, 40 on each side of the boom head. At this time, the coupler pins 36 can be extended, thus passing through the apertures in the implement and locking the implement 22 to the machine 10.

With regard to the particular construction of the quick coupler assembly 20, it will be understood that this invention is equally applicable to other quick coupler constructions having at least one power-operated actuator operable to release the implement from the machine.

Figure 3:
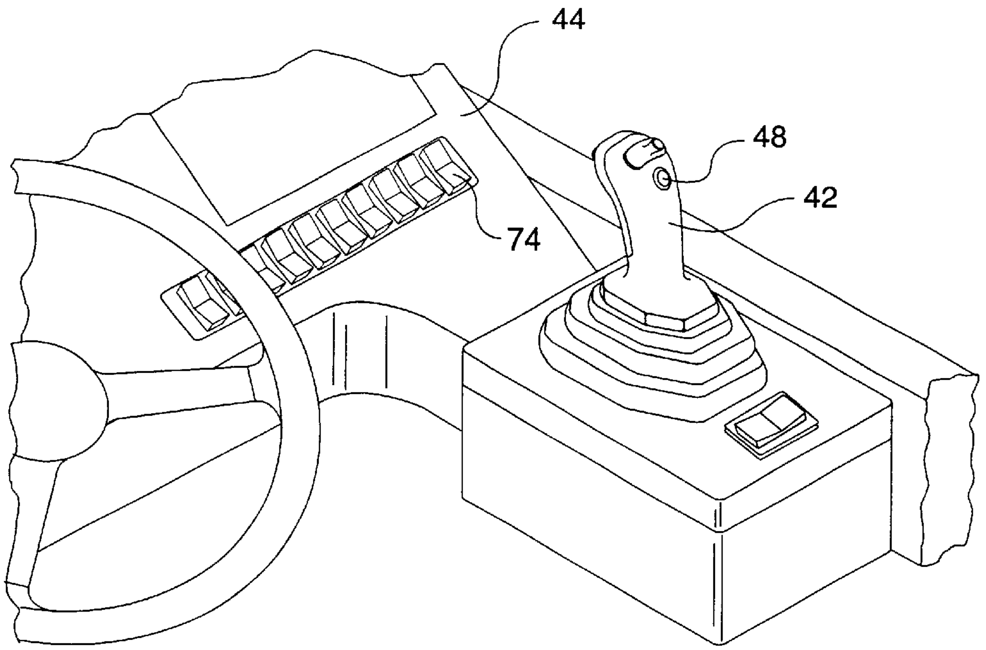
FIG. 3 illustrates the machine controls in an exemplary operator cab of a work machine with which this invention may be used.
Figure 4:
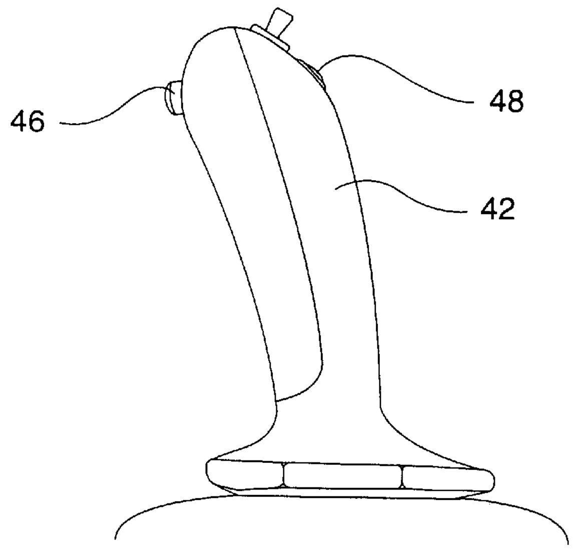
FIG. 4 is a side view of a joystick illustrated in FIG. 3.

Referring now to FIGS. 3 and 4, an exemplary operator cab 16 is illustrated and includes a conventional joystick 42 for controlling operation of the boom 14, and a dashboard 44. As mentioned above, in known systems, momentary push-button switches 46, 48 or the like have been provided on the joystick 42 to activate certain hydraulic functions, including extension and retraction of the coupler pins 36 as well as other auxiliary hydraulic functions (if any) of the implement 22. Here, it will be noted that the quick coupler structure and operation described thus far is known in the art.

Figure 5:
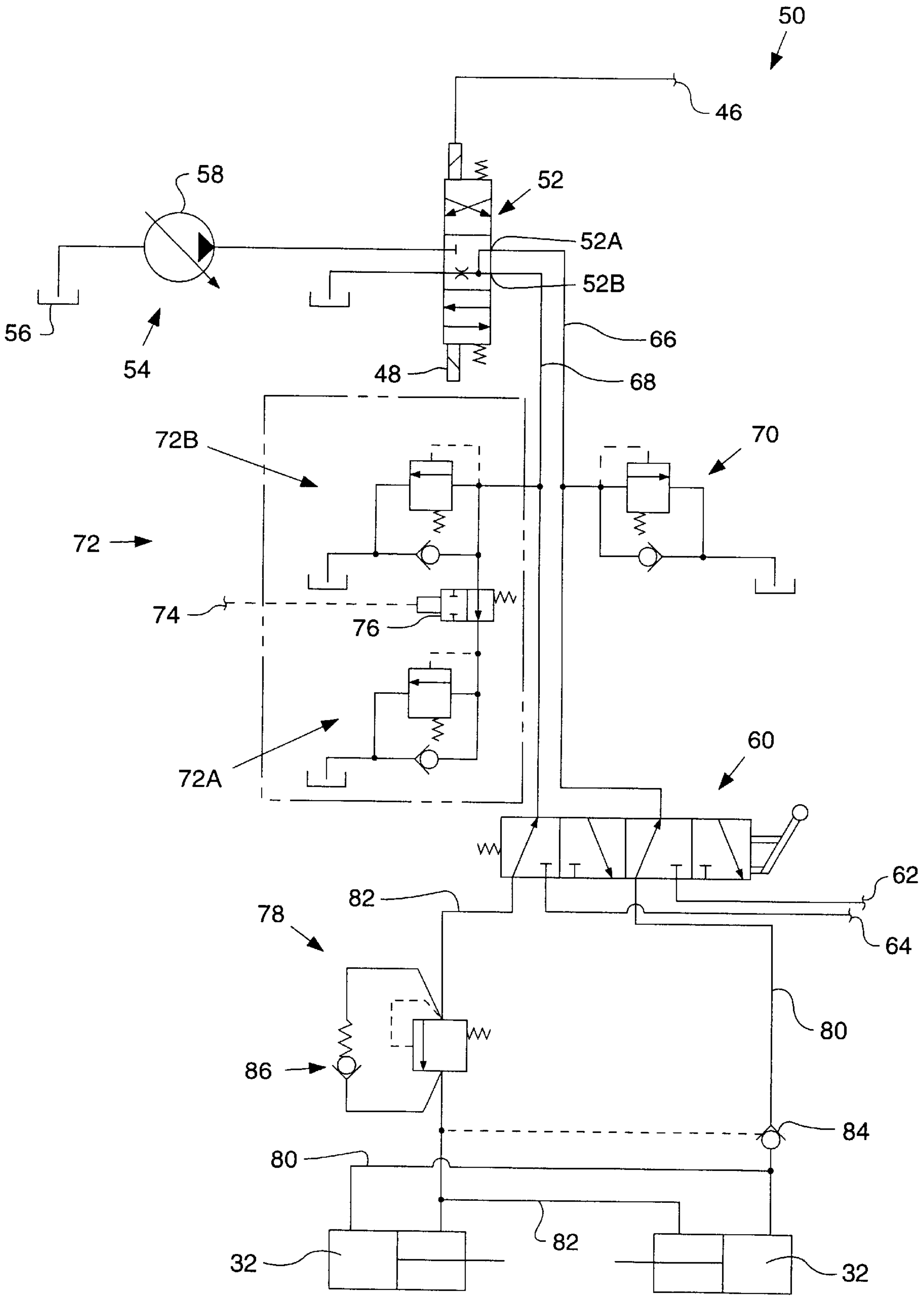
FIG. 5 is a circuit diagram illustrating a hydraulic circuit forming part of this invention.

FIG. 5 illustrates a hydraulic control system 50 in accordance with this invention. The control system 50 includes a main control valve 52, which has two outlet ports 52A, 52B controlled by the joystick-mounted switches 46, 48. Actuation of each switch, 46, 48 provides pressurized fluid, such as oil, from a source of pressurized fluid, generally designated 54, to the hydraulic circuit connected to its associated port 52A, 52B. As common, the fluid source 54 comprises a holding tank 56 from which a pump 58 pumps oil or other fluid. The maximum pressure supplied by the pump 58 to the circuits connected to the main valve 52 is preferably on the order of 3625 PSI.

The control system 50 includes a manually operated diverter valve 60, which is preferably located on or near the boom head. The diverter valve 60 can be positioned in a "quick coupler" position or an "auxiliary hydraulics" position. It will be recognized that the diverter valve 60 may alternatively be a power-operated valve.

Figure 6:
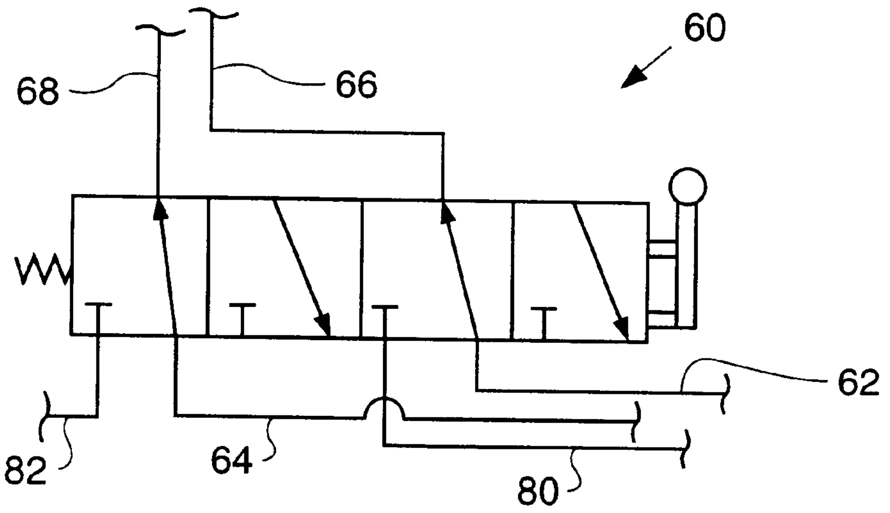
FIG. 6 illustrates the diverter valve shown in FIG. 6 but shows the diverter valve in an "auxiliary hydraulics" position.

In the "auxiliary hydraulics" position, which is illustrated in FIG. 6, the diverter valve directs fluid from each port 52A, 52B to connection ports, designated 62 and 64, via lines 66 and 68, respectively. Each of the connection ports 62, 64 is provided for supplying hydraulic power to auxiliary hydraulic devices, if any, on the implement 22 or elsewhere. A conventional 2000 PSI relief valve 70 is connected to the line 66 so that a maximum fluid pressure of 2000 PSI is available from line 66. A conventional dual setting pressure relief valve 72, which is ordinarily set at 2000 PSI, is connected to the line 68 to similarly limit the pressure available from line 68. Accordingly, each of the connection ports 62, 64 is capable of supplying fluid at a pressure of 2000 PSI in response to actuation of the joystick switches 46, 48, respectively, when the diverter valve 60 is in the "auxiliary hydraulics" position shown in FIG. 6.

For reasons which will become apparent, the dual setting relief valve 72 comprises a first relief valve 72A operating at a pressure of 2000 PSI and a second relief valve 72B operating at a higher pressure setting which, for the illustrated embodiment, is greater than 2500 PSI. In normal operation, fluid in the line 66 flows to the 2000 PSI relief valve 72A to limit pressure from line 66 to 2000 PSI. However, actuation of a momentary switch 74 activates a solenoid valve 76 that directs fluid from line 66 to the higher pressure relief valve 72B, thus permitting a higher pressure, which is greater than 2500 PSI for the illustrated embodiment, from line 66 when the switch 74 is depressed.

When the diverter valve is in the "quick coupler" position, which is illustrated in FIG. 5, fluid from the ports 52A, 52B is directed to a quick coupler circuit, generally designated 78. The circuit 78 includes two fluid paths 80, 82, preferably formed from rigid tubing. The fluid path 80 is connected at one end to fluid line 66 via the diverter valve 60 and at the opposite ends to the head ends of the actuators 32. A check valve 84 is provided in the fluid path 80 between the diverter valve 60 and the actuators 32. Fluid path 82 is connected at one end to fluid line 68 via the diverter valve 60 and at the opposite ends to the rod ends of the actuators 32. A connection is also made from the path 82 to the check valve 84 for reasons that will be described below. A conventional 2500 PSI relief valve 86, which acts as a sensor, is provided in the fluid path 82 in such a manner to permit fluid flow therethrough to the remainder of the fluid path 82 only if the fluid is at a pressure of at least 2500 PSI. Of course, other pressure settings greater than 2000 PSI may be used, as will become apparent. If fluid supplied to the fluid path 82 is at sufficient pressure to pass the relief valve 82, fluid is supplied to the rod ends of the actuators 32. Fluid is also then supplied to the check valve 84, which opens the check valve 84 and permits oil in the head ends of the actuators 32 to be exhausted to tank via the main control valve 52. The momentary switch 74 is preferably located on the machine dashboard 44 or another suitable location not on the joystick 42 and is hereafter referred to as the dashboard switch 74, regardless of where it may be located. Of course, the dashboard switch 74 could be located on the joystick 42 or elsewhere other than the dashboard, if desired, without departing from the scope of this invention.

INDUSTRIAL APPLICABILITY

In operation, the control system 50 serves to substantially prevent inadvertent and unintended release of the implement 22 from the quick coupler assembly 20. In order to operate the quick coupler 18, the manual diverter valve 60 must first be set to the "quick coupler" position illustrated in FIG. 5. However, with the system 50 in this condition, the coupler pins 36 cannot be retracted simply by pressing the joystick switch 48. Depressing only the joystick switch 48 provides a 2000 PSI fluid flow to the coupler fluid path 82, which is not sufficient to pass the 2500 PSI relief valve 86. Accordingly, no fluid is supplied to the rod ends of the actuators 32 and the coupler pins 36 are not retracted.

To retract the coupler pins 36 and thus release the implement 22 from the quick coupler assembly 20, both the joystick switch 48 and the dashboard switch 74 must be depressed concurrently. As before, when the joystick switch 48 is depressed, fluid is supplied to the fluid path 82 at 2000 PSI, which is not sufficient to retract the coupler pins 36. With the joystick switch 48 depressed, the dashboard switch is then depressed, which increases the pressure in fluid path 82 to the higher setting of the second relief valve 72*b*, which is higher than 2500 PSI in the illustrated embodiment. Consequently, with both switches depressed, the coupler pins 36 are retracted to release the implement 22. It will be apparent to those skilled in the art that the dashboard switch 74 can be depressed prior to (or simultaneous with depression of the joystick switch 48 to achieve the same result, the key to retraction of the coupler pins 36 being the concurrent actuation of both the switch 48 and the switch 74.

It will also be noted that no actuation of the switch 74 is required to extend the actuator pins 36. In addition, the pressure boost available by actuation of the switch 74 may also be used for other suitable purposes when the diverter valve 60 is in the "auxiliary hydraulics" position.

One skilled in the art will recognize that a control system equivalent to the control system 50 may be used in appropriate circumstances for coupler pin actuators powered by fluids other than oil, such as air, or by sources other than pressurized fluid, such as electricity. For example, the two switch configuration described above could be provided to produce a first electrical signal when one switch is depressed and a second, higher electrical signal when another switch is concurrently depressed. This signal could be evaluated by a suitable sensor or other device to determine whether the higher signal was received and to produce a responsive control signal to thereby control operation of the coupler pin actuators. In this electrical configuration, the desired result could also be achieved by a second signal lower or otherwise distinguishable from the first signal. This configuration, however, should not be confused with known two switch electrical control systems that simply have an open circuit unless two separate (and typically spaced-apart) normally-open switches are actuated concurrently to close the electrical circuit.

Although the presently preferred embodiments of this invention have been described, it will be understood that within the purview of the invention various changes may be made within the scope of the following claims.

What is claimed is:

1. A control system for a fluid actuator, comprising:

a pressurized fluid source supplying fluid at a first pressure and, on demand, at a second pressure higher than said first pressure;

an actuator fluid circuit connected between said source and said actuator;

a first switch operable, when actuated, to selectively supply fluid from said source to said actuator circuit;

a relief valve intermediate said source and said actuator, said relief valve permitting the flow of fluid to said actuator only if the fluid pressure is at least said second pressure; and a second switch operable, when actuated, to raise the fluid pressure supplied by said source from said first pressure to said second pressure;

whereby pressurized fluid is supplied to said actuator only by concurrent actuation of said first and second switches.

2. The control system of claim 1 including a fluid-powered coupler with at least one fluid powered actuator operable to shift said coupler between a coupled condition and a released condition, said coupler being shifted between said coupled condition and said released condition only by concurrent actuation of said first and second switches.

3. The coupler system of claim 2 wherein said machine includes a control joystick, wherein one of said first and second switches is located on said joystick and the other of said first and second switches at a location other than on said joystick.

4. The coupler system of claim 3 wherein said first switch is located on said joystick.

5. The coupler system of claim 2 wherein said pressurized fluid power source comprises a dual setting relief valve responsive to said first and second switch.

6. The coupler system of claim 2 further comprising a diverter valve intermediate said power source and said fluid circuit, said diverter valve selectively routing fluid from said source to said actuator fluid circuit or an alternative fluid circuit.

7. The coupler system of claim 6 wherein said diverter valve is a manual diverter valve.

8. A method for supplying pressurized fluid to a fluid actuator, comprising:

providing a source of fluid under pressure;

providing a fluid circuit connecting said actuator with said source;

supplying fluid from said source to said fluid circuit at a first pressure in response to actuation of a first switch;

restricting flow of fluid from said source to said actuator through said fluid circuit if the pressure of said fluid is less than a predetermined second pressure that is greater than said first pressure; and increasing the pressure of the fluid supplied from said source to said fluid circuit in response to actuation of a second switch;

whereby pressurized fluid is supplied to said actuator only by concurrent actuation of said first and second switches.

9. The method for supplying pressurized fluid to a fluid actuator of claim 8 wherein the step of increasing the pressure of the fluid supplied from said source includes the step of:

selectively shifting a coupler having the fluid actuator between a coupled condition and a released condition.

10. The method of claim 9 wherein said machine includes a control joystick, wherein one of said first and second switches is located on said joystick and the other of said first and second switches at a location other than on said joystick.

11. The method of claim 10 wherein said first switch is located on said joystick.

12. The method of claim 9 wherein said pressurized fluid power source comprises a dual setting relief valve responsive to said first switch.

13. A control system for supplying power to an actuator, comprising:

a power source for supplying power at a first level and, on demand, at a second level higher than said first level;

an actuator power circuit connected between said source and said actuator;

a first switch operable, when actuated, to produce a first control signal corresponding to said first power level;

a second switch operable, when actuated, to produce a second control signal distinguishable from said first control signal if said first switch is concurrently actuated that causes the power level supplied by said source to be raised from said first power level to said second power level; and a sensor that receives the control signals produced by actuation of said switches, said sensor producing a responsive control signal to permit the flow of power to said actuator from said source only if said second control signal is sensed by said sensor.

14. The control system of claim 13 wherein actuation of said first switch causes power to be selectively supplied from said source to said actuator, and wherein actuation of said second switch causes the power level supplied by said source to be raised from said first level to said second level.

15. The control system of claim 14 wherein said actuator comprises a fluid-powered actuator, wherein said power source comprises a pressurized fluid source, wherein said first and second power levels comprise first and second fluid pressures, and wherein said power control system comprises a relief valve.

* * * * *